(12) United States Patent
Kwon et al.

(10) Patent No.: US 12,265,709 B2
(45) Date of Patent: Apr. 1, 2025

(54) APPARATUS AND METHOD FOR ENHANCING LAUNCH SPEED OF LARGE-MEMORY CONSUMING APP

(71) Applicant: SAMSUNG ELECTRONICS CO., LTD., Suwon-si (KR)

(72) Inventors: Jiman Kwon, Suwon-si (KR); Dongho Kim, Suwon-si (KR); Jaehyeon Park, Suwon-si (KR); Geonhee Back, Suwon-si (KR); Dongwook Lee, Suwon-si (KR); Daehyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 17/982,106

(22) Filed: Nov. 7, 2022

(65) Prior Publication Data

US 2023/0168810 A1 Jun. 1, 2023

Related U.S. Application Data

(63) Continuation of application No. PCT/KR2022/013003, filed on Aug. 31, 2022.

(30) Foreign Application Priority Data

| Nov. 30, 2021 | (KR) | ............ 10-2021-0168247 |
| Dec. 27, 2021 | (KR) | ............ 10-2021-0188809 |

(51) Int. Cl.
G06F 3/06 (2006.01)

(52) U.S. Cl.
CPC .......... G06F 3/0613 (2013.01); G06F 3/0653 (2013.01); G06F 3/0673 (2013.01)

(58) Field of Classification Search
None
See application file for complete search history.

(56) References Cited

U.S. PATENT DOCUMENTS

| 10,747,467 B2 | 8/2020 | Dzeryn et al. |
| 11,023,372 B2 | 6/2021 | Wang et al. |
| (Continued) | | |

FOREIGN PATENT DOCUMENTS

| CN | 108182131 | 6/2018 |
| KR | 10-2008-0052339 A | 6/2008 |
| (Continued) | | |

OTHER PUBLICATIONS

Han et al., "A Hybrid Swapping Scheme Based On Per-Process Reclaim for Performance Improvement of Android Smartphones", IEEE Access, vol. 6, Oct. 2018, pp. 56099-56108.

(Continued)

*Primary Examiner* — Yaima Rigol
*Assistant Examiner* — Alexander J Yoon
(74) *Attorney, Agent, or Firm* — Nixon & Vanderhye, P.C.

(57) ABSTRACT

Provided is an apparatus and method for improving the entry speed of a large-memory consuming application in an electric device which detect an execution of an application, check if the application is a large-memory consuming application which uses a large amount of memory, and if the application is the large-memory consuming application, execute pre-process thread reclaim, select a process corresponding to a reclaiming target among processes currently resident in the memory, reclaim part of the memory being used by the selected process without terminating the selected process, and thereby improve the entry speed of a large-memory consuming application.

18 Claims, 6 Drawing Sheets

(56) References Cited

U.S. PATENT DOCUMENTS

| | | | |
|---|---|---|---|
| 2007/0011415 A1 | 1/2007 | Kaakani et al. | |
| 2012/0192186 A1* | 7/2012 | Bornstein | G06F 9/5011 |
| | | | 718/100 |
| 2014/0282589 A1* | 9/2014 | Kuang | G06F 9/5016 |
| | | | 718/104 |
| 2018/0276042 A1* | 9/2018 | Toal | G06F 11/3037 |
| 2019/0220318 A1* | 7/2019 | Yang | G06F 9/5022 |
| 2021/0034422 A1* | 2/2021 | Burriss | G06F 12/023 |

FOREIGN PATENT DOCUMENTS

| | | |
|---|---|---|
| KR | 10-2012-0139541 | 12/2012 |
| KR | 10-1591601 B1 | 2/2016 |
| KR | 10-2017-0092912 A | 8/2017 |
| KR | 10-1882704 | 7/2018 |
| KR | 10-2020-0060421 A | 5/2020 |
| KR | 10-2022-0102056 | 7/2022 |

OTHER PUBLICATIONS

International Search Report mailed Dec. 6, 2022 issued in International Application No. PCT/KR2022/013003 (3 pages).

* cited by examiner

→ # APPARATUS AND METHOD FOR ENHANCING LAUNCH SPEED OF LARGE-MEMORY CONSUMING APP

CROSS-REFERENCE TO RELATED APPLICATIONS

This application is a continuation of International Application No. PCT/KR2022/013003 designating the United States, filed on Aug. 31, 2022, in the Korean Intellectual Property Receiving Office and claiming priority to Korean Patent Application No. 10-2021-0168247 filed on Nov. 30, 2021, in the Korean Intellectual Property Office, and to Korean Patent Application No. 10-2021-0188809, filed on Dec. 27, 2021, in the Korean Intellectual Property Office, the disclosures of all of which are incorporated by reference herein in their entireties.

BACKGROUND

1. Field

The disclosure relates to an apparatus and method for improving a launch speed of an application which uses a large amount of memory or reducing stuttering of the application while it is running.

2. Description of Related Art

Due to limited random access memory (RAM) capacity, embedded devices need to handle large memory demand by closing minimum essential processes to monitor the memory state and maintain an acceptable level of system performance. There are technologies in Android devices for securing kernel memory, such as kernel swap daemon (kswapd), direct reclaim, low memory killer (LMK), low memory killer daemon (LMKD) and others, for this purpose.

In Android devices, while applications (processes) which require a lot of memory in a short amount of time are increasing recently, existing memory-preparation operations start running only when available memory reaches the memory threshold, so when a large-memory consuming application is executed, its launch speed tends to be delayed due to delayed memory preparation.

Therefore, there is a need to improve application launch speed when a large-memory consuming application is executed.

SUMMARY

Embodiments of the disclosure provide a method and apparatus in which, when a large-memory consuming application is executed, a memory is prepared in advance without waiting for an existing memory-preparation operation to start, preventing and/or reducing system performance from deteriorating due to sudden use of a large amount of memory.

According to an example embodiment, a method for improving launch speed of a large-memory consuming application of an electronic device is provided, the method including: detecting an execution of an application and determining whether the application is a large-memory consuming application using an amount of memory greater than a specified amount of memory, executing a per-process thread reclaim based on the application being determined to greater than the specified among of memory consuming application, selecting a process to be reclaimed among processes currently resident in a memory, and reclaiming a part of the memory used by the selected process without ending the process.

According to an example embodiment, an electronic device includes a memory storing a process related to a running application and a background application and a processor configured to: detect an execution of an application and determine whether the application is a large-memory consuming application using an amount of memory greater than a specified amount of memory, execute a per-process thread reclaim based on the application being determined to be a large-memory consuming application, select a process to be reclaimed among processes currently resident in the memory, and reclaim a part of the memory used by the selected process without ending the process.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
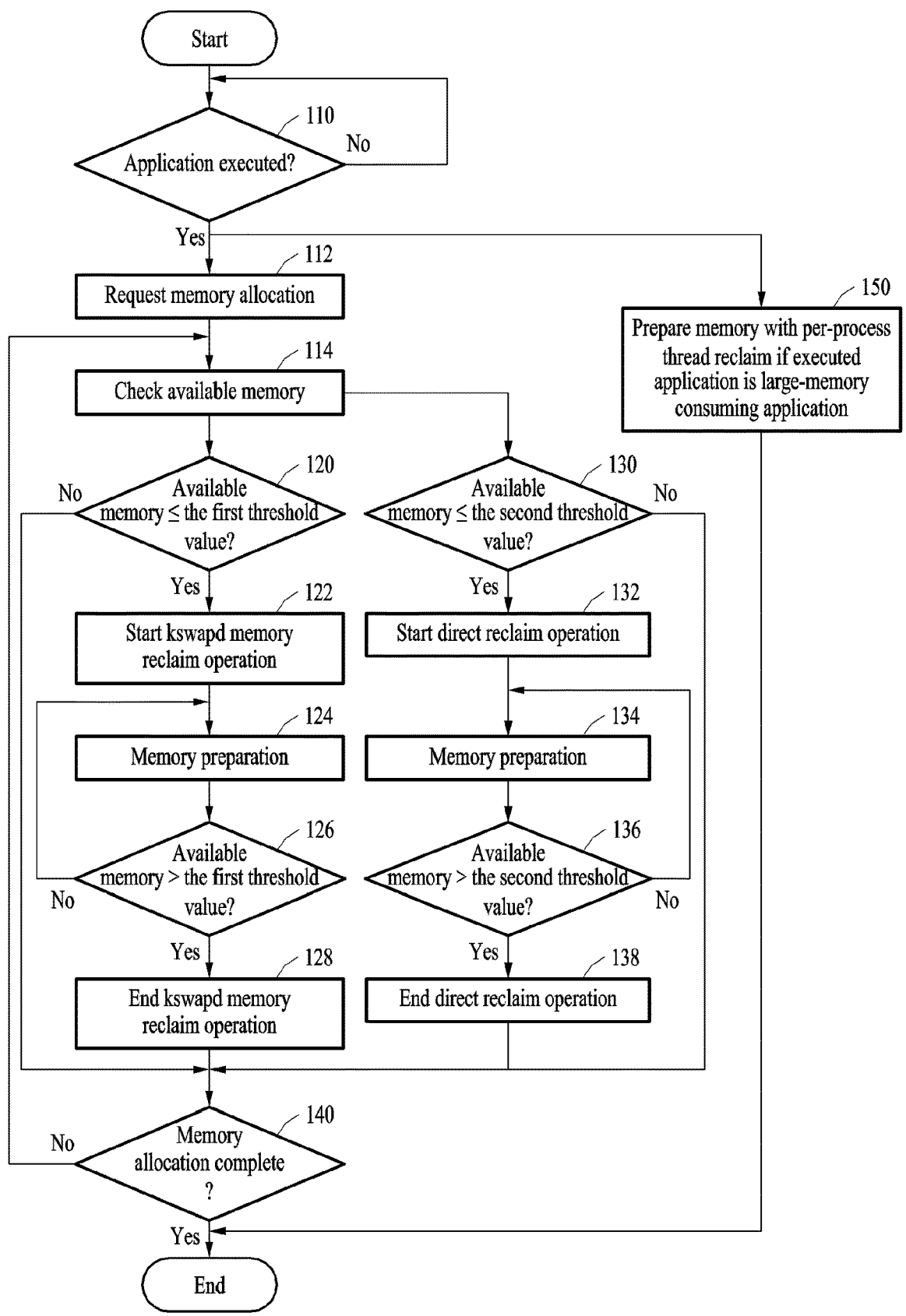
FIG. 1 is a flowchart illustrating an example process of improving launch speed of an application using a large amount of memory in an electronic device according to various embodiments.

Hereinafter, various example embodiments will be described in greater detail with reference to the accompanying drawings. However, various alterations and modifications may be made to the embodiments. Here, the embodiments are not intended to be limited by the descriptions of the present disclosure. The embodiments should be understood to include all changes, equivalents, and replacements within the idea and the technical scope of the disclosure.

The terminology used herein is for the purpose of describing particular examples and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like elements and a repeated description related thereto may be omitted. In the description of the embodiments, a detailed description of well-known related structures or functions may be omitted when it is deemed that such description will cause ambiguous interpretation of the present disclosure.

In the description, terms such as first, second, A, B, (a), (b) or the like may be used herein when describing components of the present disclosure. These terms are used for the purpose of discriminating one element from another element, and the nature, the sequences, or the orders of the elements are not limited by the terms. When one element is described as being "connected", "coupled", or "attached" to another element, it should be understood that one element can be connected or attached directly to another element, and an intervening element can also be "connected", "coupled", or "attached" to the elements.

The same name may be used to describe an element included in the embodiments described above and an element having a common function. Unless otherwise mentioned, the descriptions of the embodiments may be applicable to the following embodiments and thus, duplicated descriptions may not be repeated for conciseness.

Hereinafter, an apparatus and method for improving launch speed of a large-memory consuming application according to various example embodiments will be described in greater detail with reference to FIGS. 1 to 6.

FIG. 1 is a flowchart illustrating an example process of improving launch speed of an application using a large amount of memory in an electronic device according to various embodiments.

Referring to FIG. 1, when an application is executed in operation 110, the electronic device may request allocation of a memory requested by the executed application in operation 112. If the executed application is a large-memory consuming application (e.g., and application consuming an amount of memory greater than a specified amount of memory), the electronic device may prepare the memory requested by the executed app, using a separate per-process thread reclaim in operation 150. Operation 150 is described in greater detail below with reference to FIG. 2.

In operation 114, the electronic device checks available memory (Memfree) which can be allocated to the executed application.

In operation 120, the electronic device determines whether the available memory is less than or equal to the first threshold value.

If it is determined in operation 120 that the available memory is less than or equal to the first threshold value, the electronic device starts kswapd memory recovery in operation 122, and prepares the memory required by the application executed according to the kswapd memory recovery in operation 124. In operation 124, the electronic device may prepare the memory by operating a low memory killer daemon (LMKD), by creating a memory pressure event.

In operation 126, the electronic device determines whether the available memory is greater than the first threshold value.

If it is determined in operation 126 that the available memory is less than or equal to the first threshold value, the electronic device returns to operation 124, and if the available memory is greater than the first threshold value, the electronic device ends kswapd memory reclaim in operation 128.

Meanwhile, in parallel with operation 120, the electronic device checks whether the available memory is less than or equal to the second threshold value in operation 130. In this case, the second threshold value may be set to be less than the first threshold value. For example, direct reclaim is performed when there is less available space in the memory than the kswapd memory reclaim operation.

If it is determined in operation 130 that the available memory is less than or equal to the second threshold value, the electronic device starts a direct reclaim operation in operation 132, and prepares the memory required by the application executed according to the direct reclaim operation in operation 134. In operation 134, the electronic device may generate a memory pressure event and operate the LMKD to prepare the memory.

In operation 136, the electronic device determines whether the available memory is greater than a second threshold value.

If it is determined in operation 136 that the available memory is less than or equal to the second threshold value, the electronic device returns to operation 134, and if the available memory is greater than the second threshold value, the electronic device ends the direct reclaim operation in operation 138.

After operations 128 and 138, the electronic device checks whether the memory required by the executed application is prepared, and memory allocation is completed in operation 140.

If it is determined in operation 140 that memory allocation is not completed, the electronic device returns to operation 114.

If it is determined in operation 140 that memory allocation is completed, the electronic device ends the present process.

Referring to FIG. 1, it can be confirmed that operation 150 can operate in parallel with kswapd, direct reclaim, and LMKD. Operation 150 is described below in greater detail with reference to FIG. 2.

Figure 2:
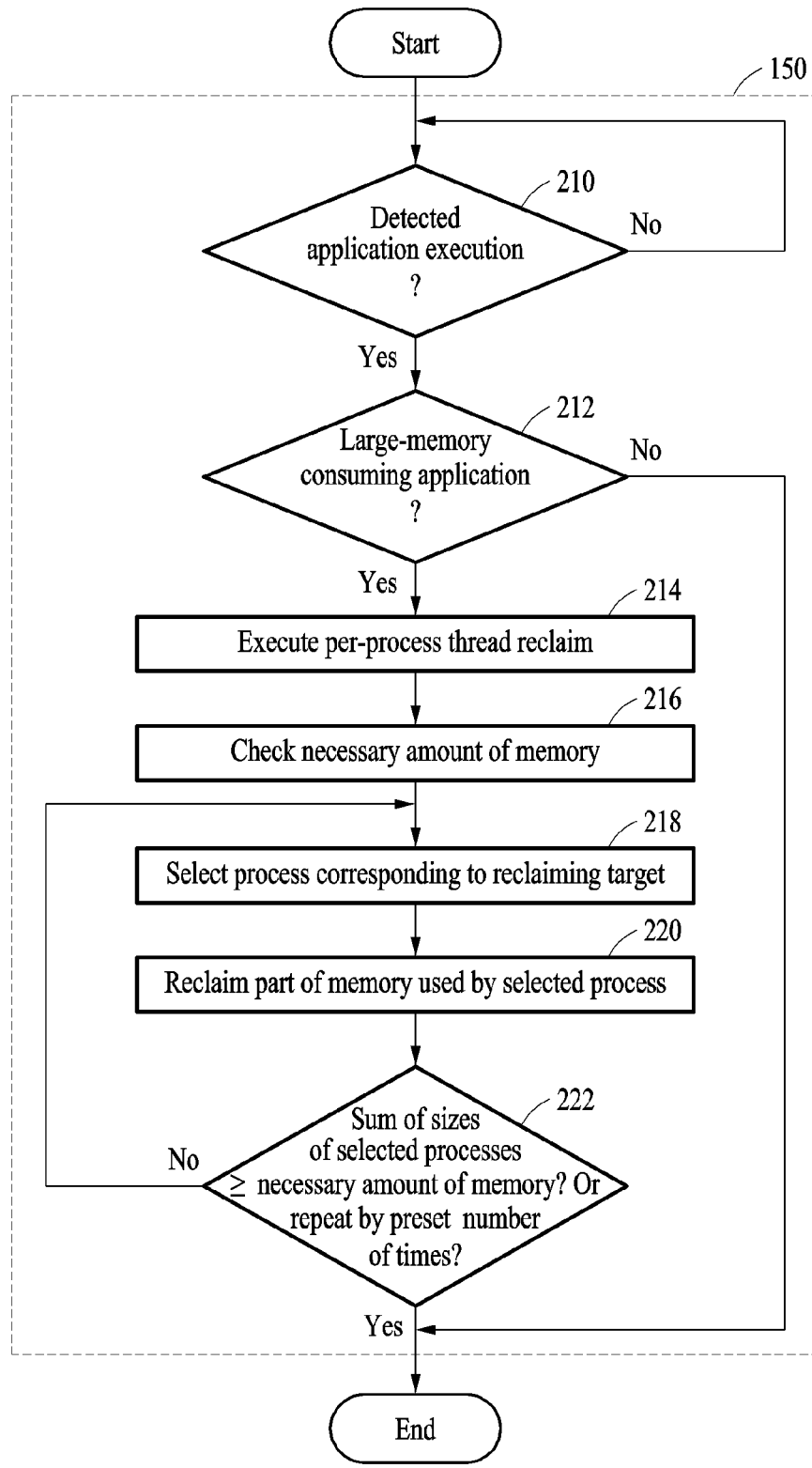
FIG. 2 is a flowchart illustrating an example process of preparing a memory in advance when executing a large-memory consuming application, using a per-process thread reclaim in an electronic device according to various embodiments.

FIG. 2 is a flowchart illustrating an example process of preparing a memory in advance when executing a large-memory consuming application, using a per-process thread reclaim in an electronic device according to various embodiments.

Referring to FIG. 2, when the electronic device detects the execution of the application in operation 210, the electronic device determines whether the application is a large-memory consuming application which uses a large amount of memory in operation 212. In this case, the execution of the application may be detected by execution of an application execution detection callback function. Whether the executed application is a large-memory consuming application may be determined by referring to the identification information of an application executed in the reclaim thread and information related to a large-memory consuming application (e.g., a list, a table, predefined, etc.). The executed application may be determined to be a large-memory consuming application if the executed application is a preset application. In this case, a preset application, which is determined to be a large-memory consuming application, may be an application which uses a camera (camera using application).

If it is determined in operation 212 that the executed application is a large-memory consuming application, the electronic device executes a per-process thread reclaim in operation 214.

The electronic device checks how much memory is needed when a per-process thread reclaim is executed in operation 216. The necessary amount of memory can be calculated by adding the previously saved information of the large-memory consuming application and associated processes, and subtracting the amount of currently available memory; the memory size of the large-memory consuming application and associated processes is saved in the memory through a per-process thread reclaim when the large-memory consuming application ends. In other words, the amount of required memory can be checked only for a large-memory consuming application that has been executed once or more than once.

In operation 218, the electronic device selects the process to be reclaimed among the processes currently resident in the memory. In this case, the electronic device may select the process to be reclaimed in the order of significance, among processes which operate in the background among processes currently resident in the memory.

In operation 220, the electronic device does not end the selected process, and reclaims part of the memory used by the selected process. Reclaiming a part of the memory used by the selected process is maintaining activities, contexts and others of the selected process in the memory and reclaiming only the code area, which is related to code; reclaiming can only delete the code area, which is a part of the selected process, in the memory.

Examples of selecting the process to be reclaimed in operation 218 and reclaiming part of the memory used by the selected process in operation 220 are described in greater detail below with reference to FIG. 4.

Figure 4:
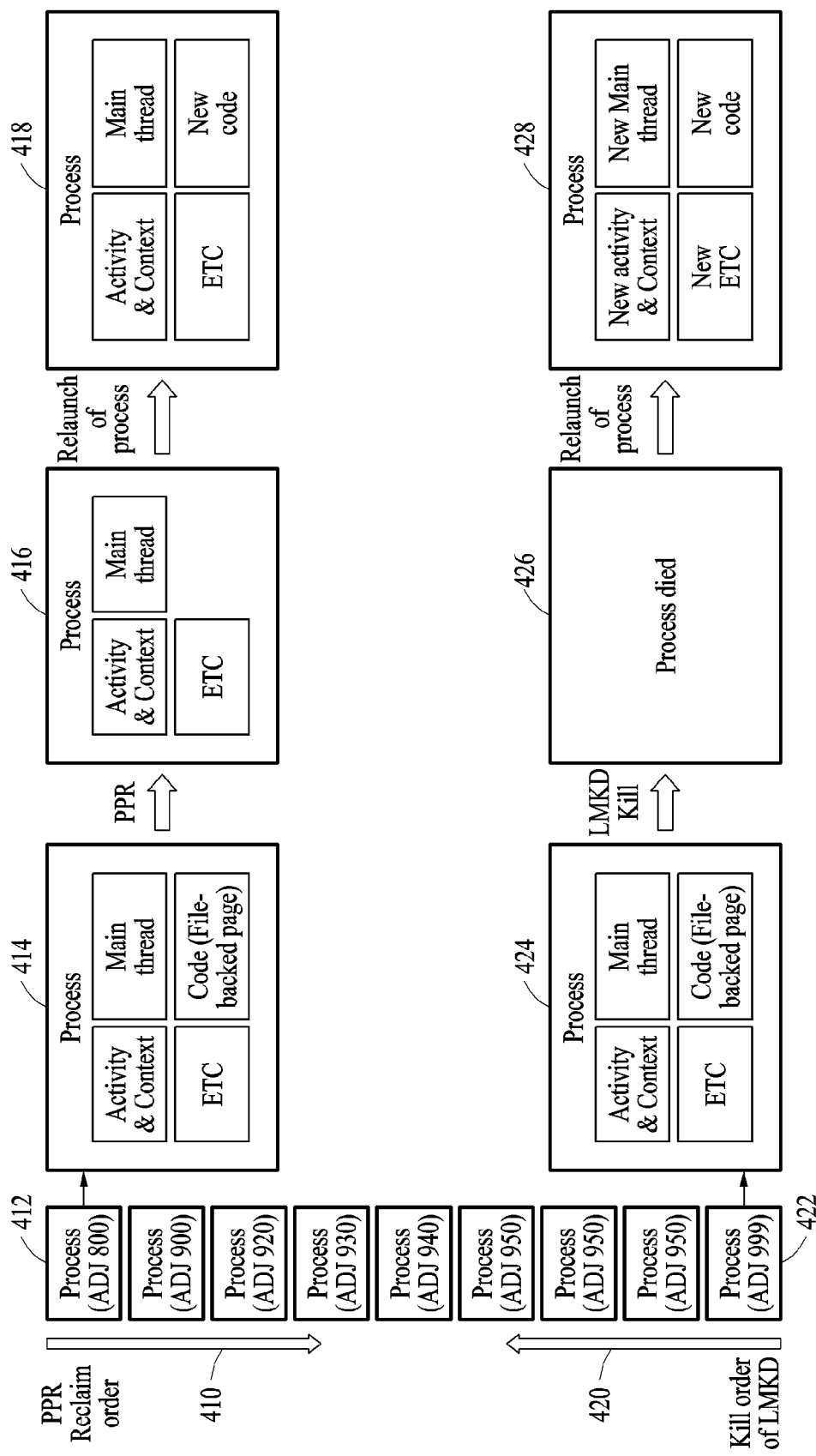
FIG. 4 is a diagram illustrating an example process selected to prepare a memory and a method of preparing the memory in an electronic device according to various embodiments.

FIG. 4 is a diagram illustrating an example process selected to prepare a memory and a method of preparing the memory in an electronic device according to various embodiments.

The process existing in the memory may have a OOM_SCORE_ADJ value from −1000 to 1000 as a value indicating the significance of the process. In this case, the closer the OOM_SCORE_ADJ value is to −1000, the higher the significance of the process, and the closer the value is to 1000, the lower the significance of the process.

A process with an OOM_SCORE_ADJ (represented as ADJ in the drawing) value of 800 to 1000 is a process operating in the background.

Referring to FIG. 4, in the case of a per-process thread reclaim, the process to be reclaimed may be selected in operation 412 in the order of decreasing significance of operation 410 among processes operating in the background, among processes currently resident in the memory, when selecting the process corresponding to the reclaiming target in operation 218.

The reason for selecting the process to be reclaimed in the order of decreasing significance among processes operating in the background is that low memory killer daemon (LMKD), which is another memory preparation method operating in parallel, selects the process to be deleted in operation 422 in the order of increasing significance of operation 420, among processes operating in the background. Thus, even if the per-process thread reclaim and LMKD operate in parallel, an identical memory preparation process is less likely to be selected at the same time.

The per-process thread reclaim does not reclaim the entire memory of a selected process 414 when reclaiming memory from the selected process 414 but reclaims only the code area in operation 416, recovering only the code area which is the area related to the code when the process restarts in operation 418, and thus preserves the final activity information of the application and enhances its launch speed.

LMKD, when reclaiming memory from a selected process 424, kills the selected process 424 and reclaims the entire memory in operation 426, preparing more memory than the per-process thread reclaim, but when the process restarts later in operation 428, the final activation information of the application is not preserved and the entry speed may be relatively slower than the per-process thread reclaim.

Returning to the description of FIG. 2, the electronic device may check whether the operation of checking if the sum of the memory used by the selected process is greater than the required memory and the operation of preparing the memory in the selected process are repeated by a set number of times. If the required amount of memory is not checked, the electronic device may check whether the operation of preparing the memory in the selected process is repeated by a set number of times in operation 222. In this case, the size of memory used by the selected process is the sum of a resident set size (RSS) value indicating the memory occupancy value of the selected processes and a swap resident set size (SwapRSS) value indicating the occupancy value of the compressed memory.

If it is determined in operation 222 that the sum of the memory sizes used by the selected process is not greater than the required memory and the operation of preparing the memory in the selected process is not repeated a set number of times, the electronic device returns to operation 218 and repeats operations 220 and 222.

If it is determined in operation 222 that the sum of the memory sizes used by the selected process is greater than the required memory or the operation of preparing the memory in the selected process is repeated a set number of times, the electronic device ends the process.

Figure 3:
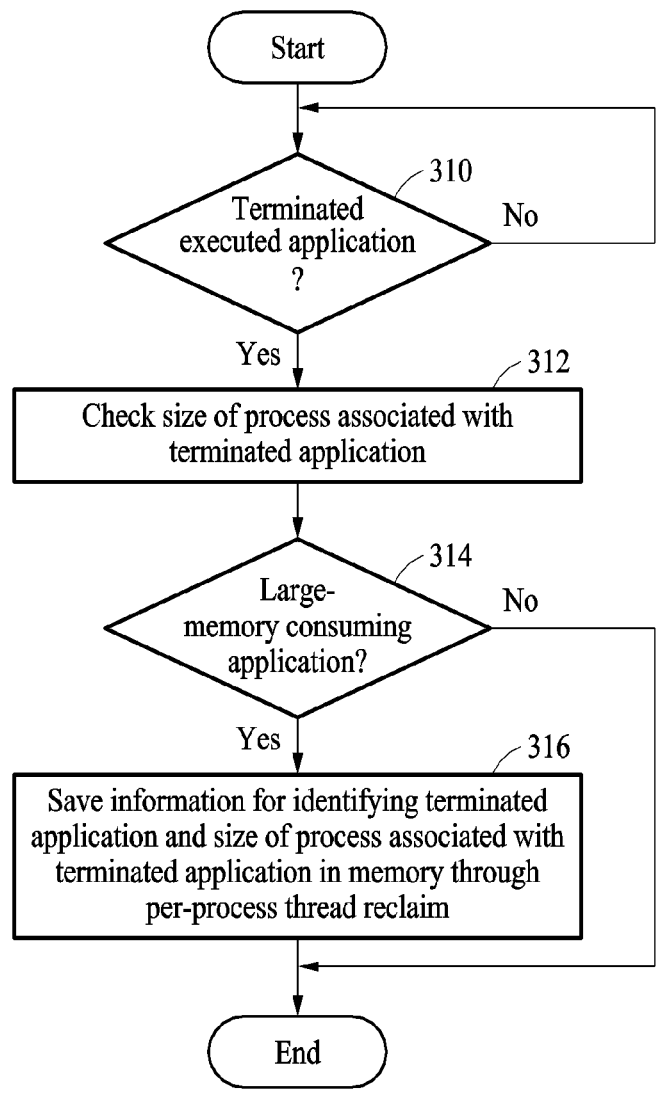
FIG. 3 is a flowchart illustrating an example process of separately saving the information of a large-memory consuming application after an application is ended in an electronic device according to various embodiments.

FIG. 3 is a flowchart illustrating an example process of separately saving the information of a large-memory consuming application after the application is ended in an electronic device according to various embodiments.

Referring to FIG. 3, when the electronic device detects termination of an application in operation 310, the electronic device checks the size of the process related to the terminated application in operation 312. In this case, the termination of the application may be detected by executing an application termination detection callback function.

The electronic device checks whether the size of the process related to the terminated application exceeds a preset reference value for determining whether the application is a large-memory consuming application in operation 314.

If it is determined in operation 314 that the size of the process related to the terminated application exceeds the preset reference value, the electronic device stores the information for identifying the terminated application and the size of the process related to the terminated application in the memory, through the per-process thread reclaim in operation 316.

Here, the size of the process is the sum of the RSS value and the SwapRSS value of the processes related to the terminated application (Main Process and Sub Process (client process)). For example, if the terminated application is a camera-using application, related processes may include a camera application process, cameraserver, and a camerahal process, and the sum of the RSS value and the SwapRSS value of the camera application process, cameraserver, and camerahal process may be the size of the process of the camera application.

Points in time when the memory is reclaimed in each memory reclaiming method when a large-memory consuming application, which is an application using a large amount of memory, is executed, is described in greater detail below in reference to FIG. 5.

Figure 5:
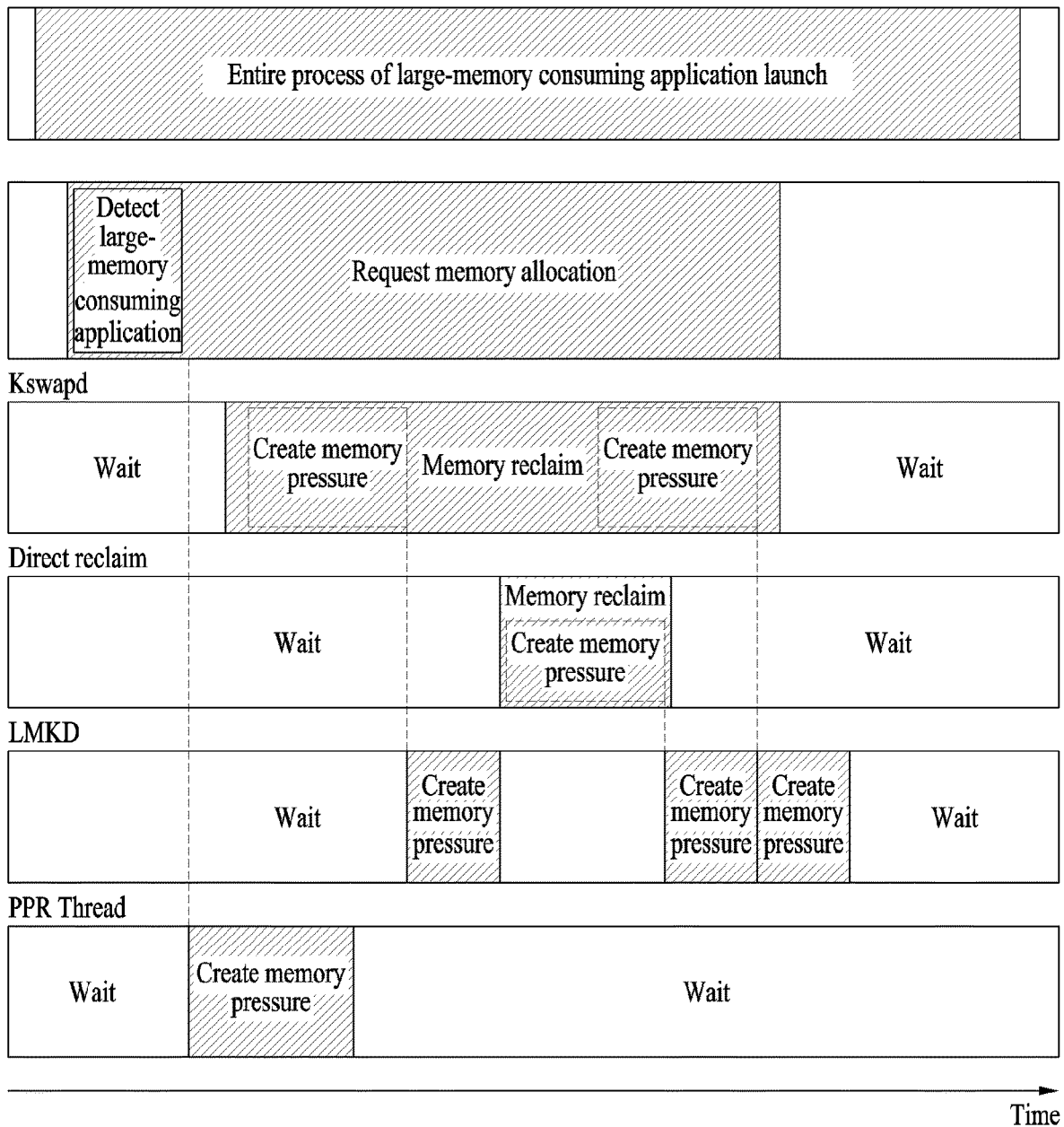
FIG. 5 is a diagram illustrating an example of a time point when a memory is prepared in an electronic device according to various embodiments.

FIG. 5 is a diagram illustrating an example of a time point when a memory is prepared in an electronic device according to various embodiments.

Referring to FIG. 5, in the case of kswapd and direct reclaim operation, which are conventional memory reclaiming methods, the available memory operates when the available memory is lower than each threshold value, and low memory killer daemon (LMKD) operates when a memory pressure event is received from the kswapd or direct reclaim operation, so it can be confirmed that memory reclaiming is performed after a large-memory consuming application is executed and the available memory runs out.

It can be confirmed that the per-process thread (PPR Thread) reclaim which operates in parallel with the existing memory reclaiming method disclosed herein reclaims the memory immediately after detecting that a large-memory consuming application is running.

Since the electronic device of the disclosure performs memory reclaiming immediately after detecting that a large-memory consuming application is executed, the memory required by the large-memory consuming application is prepared relatively faster, so a fast launch speed is achievable without stuttering caused by memory reclaiming performed while a large-memory consuming application is being run.

Figure 6:
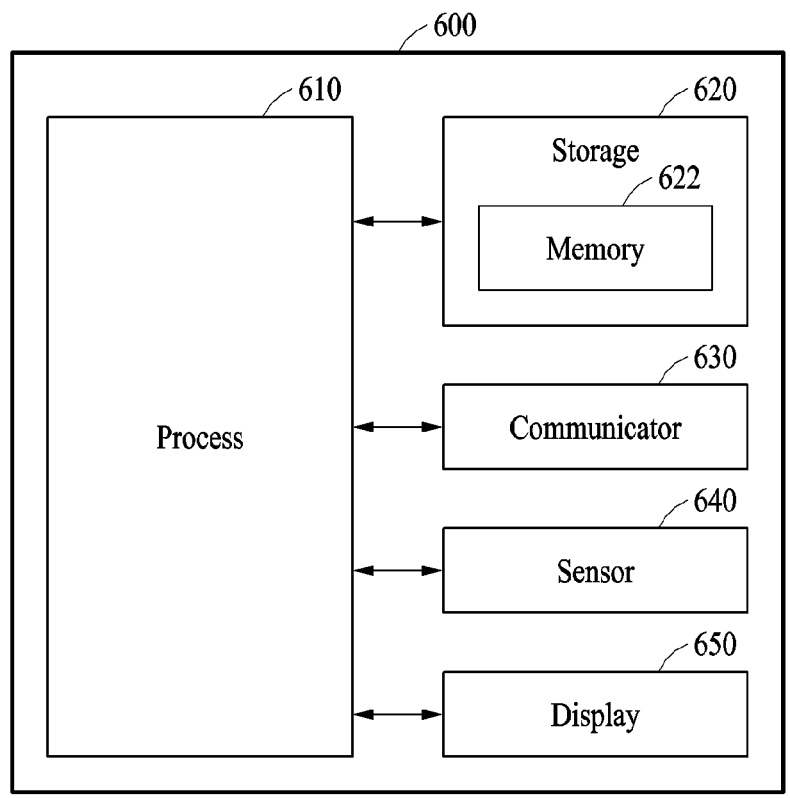
FIG. 6 is a block diagram illustrating an example configuration of an electronic device for improving launch speed of a large-memory consuming application, according to various embodiments.

FIG. 6 is a block diagram illustrating an example configuration of an electronic device for improving launch speed of a large-memory consuming application, according to various embodiments.

Referring to FIG. 6, an electronic device 600 may include a display 650, a storage 620, a communicator (e.g., including communication circuitry) 630, a sensor 640, and a processor (e.g., including processing circuitry) 610. However, not all of the components illustrated in FIG. 6 are essential components of the electronic device 600. The electronic device 600 may be implemented by more components than the components illustrated in FIG. 6, and the electronic device 600 may be implemented by fewer components than the components illustrated in FIG. 6. In this non-limiting example, the electronic device 600 may be an Android-based mobile terminal.

The display 650 of the electronic device 600 may generate a driving signal by converting an image signal, a data signal, an OSD signal, and a control signal processed by the processor 610.

In addition, the display 650 may display content (e.g., a moving image) input through the communicator 630 or an I/O unit (not shown). The display 650 may output an image stored in the storage 620 under the control of the processor 610.

According to an embodiment, the storage 620 of the electronic device 600 may store a program for processing and controlling the processor 610, and store data input to or output from the electronic device 600.

When the application is executed, the storage 620 may include a memory 622 for storing processes related to the executed app.

The storage 620 may include at least one type of storage media of a flash memory type, a hard disk type, a multimedia card micro type, a card type memory (e.g., an SD or XE memory), a Random Access Memory (RAM), a Static RAM, a Read-Only Memory (ROM), an Electrically Erasable Programmable ROM, a Programmable ROM, a magnetic memory, a magnetic disk, and an optical disk. Here, the memory 622 may correspond to a RAM.

According to an embodiment, the processor 610 may include various processing circuitry and control the overall operation of the electronic device 600. For example, the processor 610 may generally control the sensor 640, the communicator 630, and the like by executing programs stored in the storage 620. The processor 610 may control an operation of the electronic device 600 to perform functions of the electronic device 600 described with reference to FIGS. 1 to 3.

The processor 610 may include one or more processors. The one or more processors may include a general-purpose processor, such as a central processing unit (CPU), an application processor (AP), or a digital signal processor (DSP), or a graphic processor, such as a GPU or a vision processing unit (VPU). One or more processors may control input data to be processed according to a predefined operation rule stored in the memory.

When the processor 610 detects an execution of an application, it checks whether the application is a large-memory consuming application that uses a large amount of memory, and if the executed application is confirmed to be a large-memory consuming application, the processor 610 executes a per-process thread reclaim, selects a process corresponding to a reclaiming target among the processes currently resident in the memory 622, and reclaims a part of the memory used by the selected process without terminating the selected process.

When the per-process thread reclaim is executed, the processor 610 may repeat checking the required amount of memory, selecting a process corresponding to the reclaiming target until the sum of memory sizes used by the selected process is greater than or equal to the required memory, and reclaiming part of the memory being used by the selected process.

The processor 610, if the required amount of memory cannot be confirmed in the operation of confirming the required amount of memory, may repeat selecting a process corresponding to the reclaiming target and reclaiming a part of the memory being used by the selected process by a set number of times.

The processor 610 may determine the required amount of memory as a value obtained by subtracting the size of the available memory from the sum of the sizes of processes related to previously-stored large-memory consuming applications.

If the identification information of the executed application is included in previously stored information of a large-memory consuming application, the processor 610 may determine the executed application is a large-memory consuming application, or if the executed application is a preset application, the processor 610 may determine the executed application is a large-memory consuming application.

When selecting a process corresponding to a reclaiming target among the processes currently resident in the memory 622, the processor 610 may select the process corresponding to a reclaiming target in the order of decreasing significance among the process executed in the background, among the processes currently resident in the memory 622.

The processor 610, when reclaiming a portion of the memory being used by the selected process without terminating the selected process, may reclaim only the code area while maintaining the activity and context of the selected process in the memory 622.

When the application is terminated, the processor 610 checks the size of the processes related to the terminated application, checks if the size of the processes related to the terminated application exceeds the preset reference value, and if the size of the processes related to the terminated application exceeds the preset reference value, the processor 610 may save the information for identifying the terminated application and the size of the processes related to the terminated application in the memory through the per-process thread reclaim.

In addition, the communicator 630 may include one or more components, including various communication circuitry, for the electronic device 600 to communicate with an external device. For example, the communicator 630 may include a short-range wireless communicator (not shown), a mobile communicator (not shown), and a broadcast receiver (not shown).

The short-range wireless communicator may include a Bluetooth communicator, a BLE communicator, a near field communicator, a WLAN (Wi-Fi) communicator, a Zigbee communicator, an infrared data association (IrDA) communicator, a Wi-Fi direct (WFD) communicator, an ultra-wideband (UWB) communicator, and an Ant+ communicator, but the examples are not limited thereto.

The mobile communicator 630 may include various communication circuitry and transmit and receive a wireless signal to and from at least one of a base station, an external terminal, and a server on a mobile communication network. In this case, the wireless signal may include various types of data, based on transmission and reception of a voice call signal, a video communication call signal, or a text or multimedia message.

The broadcast receiver may receive a broadcast signal and/or information on broadcast from an external device through a broadcast channel. The broadcast channel may include a satellite channel and a terrestrial channel. Depending on an implementation example embodiment, the electronic device 600 may not include the broadcast receiver.

The sensor 640 may detect a state of the electronic device 600 or a state around the electronic device 600, and may provide the detected information to the processor 610.

The sensor 640 may include at least one of a magnetic sensor, an acceleration sensor, a temperature/humidity sensor, an IR sensor, a gyroscope sensor, a position sensor (e.g., a GPS), a light sensor, a proximity sensor, and an RGB sensor (e.g., an illuminance sensor), however, the examples are not limited thereto. Since one skilled in the art may intuitively infer a function of each sensor from its name, a detailed description thereof is omitted.

The sensor 640 may detect an external impact applied to the electronic device 600. According to an embodiment, the acceleration sensor included in the electronic device 600 may detect an impact caused by a touch operation with a display device 100. Also, the acceleration sensor included in the electronic device 600 may sense the moving speed and acceleration of the electronic device 600.

The disclosure describes a method and device that preemptively prepares the memory when an application that uses a large amount of memory is executed without waiting for the existing memory preparation operation, enhancing the entry speed of the large-memory application and preventing/reducing the deterioration of the system performance caused by a sudden use of a large amount of memory.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files including higher-level code that may be executed by the computer using an interpreter. The above-described devices may be configured to act as one or more software modules in order to perform the operations of the above-described example examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is not limited by the detailed description, and includes the claims and their equivalents, and all variations within the scope of the claims and their equivalents are to be construed as being included in the disclosure.

What is claimed is:

1. A method for improving a launch speed of a large-memory consuming application of an electronic device, the method comprising: determining whether an application is the large-memory consuming application which uses an amount of memory greater than a specified amount of memory, based on an execution of the application being detected; and based on determining that the application is the large-memory consuming application, executing a per-process thread reclaim by: selecting a process to be reclaimed among processes currently resident in a memory; and reclaiming a part of the memory used by the selected process without ending the selected process, wherein the reclaiming reclaims, in the memory, a code area related to program code of the selected process and wherein an activity and a context of the selected process are maintained in the memory.

2. The method of claim 1, further comprising:
checking a necessary amount of memory, based on the per-process thread reclaim being executed,
wherein the selecting of the process to be reclaimed among the processes currently resident in the memory and the reclaiming of the part of the memory used by the selected process are repeated until a first sum of memory sizes used by the selected process is greater than or equal to the necessary amount of memory, or are repeated a specified number of times.

3. The method of claim 2, further comprising checking an amount of memory, and wherein the selecting of the process to be reclaimed among the processes currently resident in the memory and the reclaiming of the part of the memory used by the selected process are repeated the specified number of times, based on the amount of memory obtained by the checking not being the necessary amount of memory.

4. The method of claim 2, wherein the checking of the necessary amount of memory comprises determining the necessary amount of memory by subtracting a size of an available memory from a second sum of memory sizes of processes related to the large-memory consuming application obtained from information saved when a previous execution of the large-memory consuming application is ended.

5. The method of claim 1, wherein the determining of whether the application is the large-memory consuming application comprises:
determining that the application is the large-memory consuming application based on identification information of the executed application being included in a previously saved information of the large-memory consuming application, or
determining that the application is the large-memory consuming application based on the executed application being a specified application.

6. The method of claim 5, wherein the specified application is a camera-using application.

7. The method of claim 1, wherein the selecting of the process to be reclaimed among the processes currently resident in the memory comprises selecting a process corresponding to a reclaiming target in an order of decreasing significance among background operating processes currently resident in the memory.

8. The method of claim 1, further comprising:
checking a size of a process related to a terminated application, based on the application being terminated;
checking whether the size of the process related to the terminated application exceeds a reference value for determining whether the application is the large-memory consuming application; and
saving information for identifying the terminated application and the size of the process related to the terminated application in the memory through the per-process thread reclaim, based on the size of the process related to the terminated application exceeding the reference value.

9. The method of claim 1, wherein the per-process thread reclaim is executed in parallel with another memory management method for preparing an available space in the memory based on an available memory becoming lower than or equal to a specified available reference value.

10. The method of claim 9, wherein the other memory management method comprises at least one of kernel swap daemon (kswapd), direct reclaim, low memory killer (LMK), or low memory killer daemon (LMKD).

11. A non-transitory computer-readable storage medium storing instructions that, when executed by at least one processor, cause the at least one processor to control an electronic device to perform operations comprising: determining whether an application is a large-memory consuming application which uses an amount of memory greater than a specified amount of memory, based on an execution of the application being detected; and based on determining that the application is the large-memory consuming application: executing a per-process thread reclaim by: selecting a process to be reclaimed among processes currently resident in a memory; and reclaiming a part of the memory used by the selected process without ending the selected process, wherein the reclaiming reclaims, in the memory, a code area related to program code of the selected process and wherein an activity and a context of the selected process are maintained in the memory.

12. An electronic device comprising: memory storing a process related to a running application and a background application; and at least one processor configured to: detect an execution of an application and determine whether the application is a large-memory consuming application which uses an amount of memory greater than a specified amount of memory, and based on determining that the application is the large-memory consuming application, execute a per-process thread reclaim by: select a process to be reclaimed as a reclaiming target among processes currently resident in the memory, and reclaim a part of the memory used by the selected process without ending the selected process, wherein the reclaiming reclaims, in the memory, a code area related to program code of the selected process and wherein an activity and a context of the selected process are maintained in the memory.

13. The electronic device of claim 12, wherein the at least one processor is configured to: check a necessary amount of memory, based on the per-process thread reclaim being executed, select at least one part of the memory used by the selected process corresponding to the reclaiming target until a first sum of memory sizes used by the selected process is greater than or equal to the necessary amount of memory, or by a specified number of times, and repeatedly reclaim the at least one part of memory used by the selected process.

14. The electronic device of claim 13, wherein the at least one processor is configured to: check an amount of memory; and select the at least one part of the memory used by the selected process corresponding to the reclaiming target by the specified number of times and repeatedly reclaim the at least one part of the memory used by the selected process, based on the amount of memory obtained by the checking not being the necessary amount of memory.

15. The electronic device of claim 13, wherein the at least one processor is configured to determine the necessary amount of memory by subtracting a size of an available memory from a second sum of the memory sizes of processes related to the large-memory consuming application obtained from information saved when a previous execution of the large-memory consuming application is ended.

16. The electronic device of claim 12, wherein the at least one processor is configured to determine the executed application as the large-memory consuming application based on identification information of the executed application being included in previously saved information of the large-memory consuming application, or based on the executed application being a specified application.

17. The electronic device of claim 12, wherein the at least one processor is configured to, based on selecting the process corresponding to the reclaiming target among the processes currently resident in the memory, select the process corresponding to the reclaiming target by order of decreasing significance among background operating processes currently resident in the memory.

18. The electronic device of claim 12, wherein the at least one processor is configured to, based on the application being terminated, check a size of a second process related to the terminated application, to check whether the size of the second process related to the terminated application exceeds a reference value for determining whether the terminated application is the large-memory consuming application, and save information for identifying the terminated application and the size of the second process related to the terminated application in the memory through the per-process thread reclaim, based on the size of the second process related to the terminated application exceeding the reference value.

* * * * *